UNITED STATES PATENT OFFICE 2,634,288

TETRAALKYL ESTERS OF ALKANE DIPHOSPHONIC ACIDS

William P. Boyer and Jesse Roger Mangham, Chesterfield County, Va., assignors to Virginia-Carolina Chemical Corporation, Richmond, Va., a corporation of Virginia No Drawing. Application January 10, 1951, Serial No. 205,420

17 Claims. (Cl. 260—461)

This invention relates to symmetrical tetraalkyl esters of alkane diphosphonic acids having the general formula $$(RO)_2 \overset{O}{\underset{\|}{P}}(CH_2)_n \overset{O}{\underset{\|}{P}}(OR)_2$$

in which R is an alkyl group having at least three carbon atoms and $n$ is an integer.

We have found that the symmetrical esters embraced by the above formula, unlike the corresponding ethyl esters are relatively sparingly soluble in water and due to this and other properties such as their stability and high boiling temperatures are adapted to a variety of uses such as surface active or wetting agents, textile softening agents, plasticizers, lubricants, oil additives, hydraulic fluids, etc.

Our invention is more particularly concerned with esters embraced by the above formula in which R is an alkyl group having from 3 to 9 carbon atoms including those derived from primary and secondary alcohols and $n$ is an integer from 2 to 6.

We have prepared the esters by two methods as follows:

(1). *Reaction of trialkyl phosphites with alkane dihalides*

Equation:

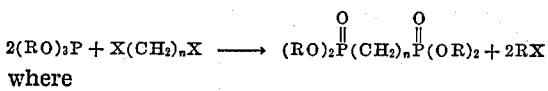

where

R is an alkyl radical
X is iodine, bromine or chlorine
$n$ is an integer.

Tetraalkyl alkane diphosphonates can be prepared by heating an alkane dihalide with an equivalent or excess of a trialkyl phosphite. After reaction is complete, low boiling material is stripped, leaving a relatively pure alkane diphosphonate. Yields vary from 50-90%. Last traces of dialkyl haloalkane phosphonate (product of incomplete reaction) can be eliminated by vacuum distillation of the product.

For this reaction primary dihalides are most desirable, secondary less and tertiary least. The halide may be iodine, bromine or chlorine. The speed of reaction decreases in the order iodide > bromide > chloride. Speed of reaction is also decreased with increase in molecular size of each particular dihalide used. The bromides were found to be the most generally satisfactory; these reacted with the various trialkyl phosphites at temperatures of 150° C. to 190° C. Reaction times range from one to five hours.

(2). *Reaction of metal salts of dialkyl phosphites with alkane dihalides*

Equation:

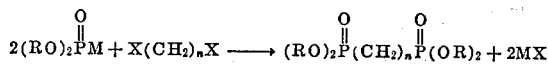

where

R is an alkyl radical
X is iodine, bromine or chlorine
$n$ is an integer
M is a metal.

When an alkane dihalide is heated in an inert solvent with an equivalent of a metal salt of a dialkyl phosphite, the metal halide precipitates and a tetraalkyl alkane diphosphonate is formed. After removal of the metal halide by filtration, centrifugation or washing with water, the solvent and low boiling materials are removed to give a relatively pure tetraalkyl diphosphonate. Yields vary from 50-90%. Final purification may be accomplished by vacuum distillation of the product.

The order of reactivity of the halides with respect to the type of halogen involved and with respect to the molecular size is the same in method (2) as in method (1). The reaction of method (2) is conveniently carried out in boiling heptane. Reaction times in this solvent are from four to sixteen hours. Other inert solvents such as pentane, hexane, octane, benzene, xylene, chlorobenzene and the like may be employed. Sodium, potassium and other active metal dialkyl phosphites may be used. These may be prepared by a well-known method.

The invention is further illustrated, but not limited, by the following examples:

EXAMPLE 1

*Preparation of tetrapropyl 1,3-propane diphosphonate*

In 3 l. of heptane (B. P. approx. 100°) in a 5 l. flask equipped with stirrer, condenser, and dropping funnel, was placed 69 g. (3 moles) of metallic sodium. After the solvent had been heated to reflux, 548.3 g. (3 moles+10% excess) of dipropyl hydrogen phosphite was added during thirty minutes. After an hour's additional refluxing, the sodium had all reacted. Into this stirred refluxing solution was then added 302.8 g. (1.5 moles) of 1,3-dibromopropane during twenty minutes. Vigorous reaction occurred during the addition of the first three-quarters of the dibromide; this was accompanied by precipitation of sodium bromide. After refluxing for eight additional hours the solution was cooled and washed thoroughly with water. After removal of the solvent and unreacted materials under reduced pressure, the crude diphosphonate was fractionated from a Claisen flask. The pure ester, B. P. 158–162°/0.25 mm., weighed 273.5 g., 49% of the theoretical. Its refractive index is 1.4452 at 23° C.

Analysis: Calc. for $C_{15}H_{34}O_6P_2$: P, 16.64. Found: P, 16.49.

EXAMPLE 2

*Preparation of tetrabutyl 1,2-ethane diphosphonate*

(1) USING SODIUM DIBUTYL PHOSPHITE

Into 250 ml. of heptane contained in a 500 ml. three-neck flask equipped with a stirrer, dropping funnel and condenser was put 4.6 g. (0.2 mole) of metallic sodium. The heptane (B. P. 100°) was brought to reflux and 38.8 g. (0.2 mole) of dibutyl hydrogen phosphite was added during about five minutes. After an hour the sodium reaction was essentially complete, 9.2 g. (0.092 mole) of ethylene dichloride was added during five minutes. After 18 hours at reflux temperature the sodium chloride was removed by a thorough washing with water. After removal of the solvent the desired tetrabutyl 1,2-ethane diphosphonate was obtained in 32% yield (12.3 g.) by vacuum distillation, B. P. 170–3°/0.2 mm. Its refractive index at 25° C. is 1.4434.

(2) USING TRIBUTYL PHOSPHITE

In a 100 ml. flask was placed 75 g. (0.3 mole) of tributyl phosphite and 18.8 g. (0.1 mole) of ethylene dibromide. This solution was heated slowly under a heated column with an attachment for measuring the butyl bromide evolved. After 2.5 hours' heating at 210–220° C., 51% of the required amount of butyl bromide had been collected. Upon distillation 26.8 g. (65%) of colorless oil, B. P. 174–180° C. at 0.4 mm., was collected—refractive index at 28° C. is 1.4425.

Analysis: Calc. for $C_{18}H_{40}O_6P_2$: P, 14.95. Found: P, 14.01, 14.39.

EXAMPLE 3

*Preparation of tetrabutyl 1,3-propane diphosphonate*

In a 5 l. three-neck flask equipped with a stirrer, condenser and dropping funnel was placed 46.0 g. (2 moles) of sodium and 2 l. of heptane, B. P. 100° C. To this refluxing mixture was added 427.3 g. (2.2 moles) of dibutyl hydrogen phosphite during 45 minutes. After an hour all the sodium had reacted, 201.9 g. (1 mole) of 1,3-dibromopropane was added over a 45-minute period. After an additional 16 hours of refluxing the sodium bromide was removed by washing with water. The solvent was removed and by stripping at a bath temperature of 220° and at a pressure of 1.5 mm., tetrabutyl 1,3-propane diphosphonate was obtained as a straw-colored oil. It weighed 324 g., a 76% yield. A portion of this material distilled readily yielding a colorless oil, B. P. 180–190 at 0.3 to 0.4 mm., $n_D^{25}$ 1.4460. The overall yield of distilled material was 67% proving the crude to be a minimum of 88% purity.

Analysis: Calc. for $C_{19}H_{42}O_6P_2$: P, 14.46. Found: P, 14.49.

EXAMPLE 4

*Preparation of tetra(2-butyl) trimethylene diphosphonate*

The reaction was carried out in a 500 ml. three-neck flask equipped with a stirrer, dropping funnel and condenser. Into 300 ml. of refluxing heptane containing 5.5 g. (0.24 mole) of sodium was added 46.6 g. (0.24 mole) of di(2-butyl) hydrogen phosphite during 45 minutes. After an hour the sodium had completely reacted. To the resulting solution was added 24.2 g. (0.12 mole) of 1,3-dibromopropane during five minutes. After seven hours refluxing the sodium bromide was removed by a thorough washing with water. After removal of the solvent the desired tetra(2-butyl) 1,3-propane diphosphonate was obtained in 42% yield (21.4 g.) by vacuum distillation, B. P. 170–3° C. at 0.5 mm. pressure, $n_D^{23.5}$ 1.4438.

Analysis: Calc. for $C_{19}H_{42}O_6P_2$: P, 14.46. Found: P, 14.04, 14.01.

EXAMPLE 5

*Preparation of tetrabutyl 1,6-hexane diphosphonate*

In a 5 l. three-neck flask equipped with a stirrer, condenser and dropping funnel was placed 46.0 g. (2 moles) of sodium and 2 l. of heptane, B. P. 100° C. To this refluxing mixture was added 427.3 g. (2.2 moles) of dibutyl hydrogen phosphite during 55 minutes. After two hours when the sodium had been used up, 243.9 g. (1 mole) of 1,6-dibromohexane was added over a 1-hour period. After an additional 16 hours of refluxing the sodium bromide was removed by washing with water. The solvent was removed and by stripping at a bath-temperature of 230° at 0.3 mm. pressure, tetrabutyl 1,6-hexane diphosphonate was obtained as a colorless oil. It weighed 344.9 g., a 72% yield. A portion of this material distilled readily yielding a colorless oil, B. P. 210–214° C. at 0.31 mm., $n_D^{24}$ 1.4485. The overall yield of distilled material was 58% proving the crude to be a minimum of 81% purity.

Analysis: Calc. for $C_{22}H_{48}O_6P_2$: P, 13.17. Found: P, 12.52, 12.53.

EXAMPLE 6

*Preparation of tetraamyl 1,2-ethane diphosphonate*

In a 250 ml. flask was placed 35.1 g. (0.12 mole) of triamyl phosphite and 11.3 g. (0.06 mole) of ethylene bromide. This solution was slowly heated during 2 hours under a reflux condenser to a temperature of 190° C. Upon distillation 4.5 g. (25%) of colorless oil, B. P. 196–200° C. at 0.3 mm., was collected—refractive index $n_D^{23}$ 1.4472.

EXAMPLE 7

*Preparation of tetraamyl 1,5-pentane diphosphonate*

In a 100 ml. three-neck flask equipped with a stirrer, condenser and dropping funnel was placed 3.87 g. (0.168 mole) of sodium and 38 ml. of heptane, B. P. 100° C. To this refluxing mixture was added 37.5 g. (0.168 mole) of diamyl hydrogen phosphite during 5 minutes. After an hour when the sodium had completely reacted, 19.4 g. (0.034 mole) of 1,5-dibromopentane was added, and refluxing continued five hours. The mixture was washed with water to remove the sodium bromide. After removal of the solvent by distillation the crude ester was fractionated. It boiled at 237–248° at 0.8–1.0 mm. pressure; slight decomposition during distillation caused a drop in pressure and a corresponding range in boiling point. The yield of distilled ester was 15.8 g., 37%. Its refractive index is $n_D^{23}$ 1.4501.

Analysis: Calc. for $C_{25}H_{54}O_6P_2$: P, 12.09. Found: P, 11.86.

EXAMPLE 8

*Preparation of tetra(2-ethyl butyl) 1,3-propane diphosphonate*

In a 1 l. flask equipped with a stirrer, dropping funnel and condenser was placed 400 ml. of heptane, B. P. 100°, and 18.7 g. (0.814 mole) of sodium. Into this refluxing mixture was dropped 203.7 g. (0.814 mole) of di(2-ethyl butyl) hydrogen phosphite during 45 minutes. After an hour the sodium had completely reacted. To the resulting solution was added 82.3 g. (0.407 mole) of 1,3-dibromopropane during thirty minutes. After sixteen hours' refluxing the sodium bromide was removed by a thorough washing with water. The solvent was removed and by stripping at a bath temperature of 160° and at a pressure of 0.1 mm., tetra(2-ethyl butyl) 1,3-propane diphosphonate was obtained as a straw-colored oil. A portion of this material distilled with slight decomposition at 198–205°/0.05 mm. Its refractive index was $n_D^{20}$ 1.4453 and the yield of pure ester was 36%.

Analytical: Calc. for $C_{27}H_{58}O_6P_2$: P, 11.45. Found: P, 11.26, 11.36.

EXAMPLE 9

*Preparation of tetraheptyl 1,4-butane diphosphonate*

In a 100 ml. three-neck flask equipped with a stirrer, condenser and a dropping funnel was placed 3.44 g. (0.15 mole) of sodium and 42 ml. of heptane, B. P. 100°. To this refluxing mixture was added 41.8 g. (0.15 mole) of diheptyl hydrogen phosphite during ten minutes. After an hour's refluxing when the sodium had completely reacted, 16.1 g. (0.075 mole) of 1,4-dibromobutane was added gradually and refluxing was continued for a total of five hours. After removal of the precipitated sodium bromide by a water washing, the solvent was removed and the low boiling material was topped to 220° C. at 0.9 mm. pressure. The resulting oil weighed 31.4 g., a 69% yield. This material distilled with some decomposition at a boiling point of 247–260° at pressure of 0.2 to 0.4 mm., $n_D^{23}$ 1.4540. The overall distilled yield was 44%.

Analytical: Calc. for $C_{32}H_{68}O_6P_2$: P, 10.14. Found: P, 10.09.

EXAMPLE 10

*Preparation of tetra(2-ethyl hexyl) 1,2-ethane diphosphonate*

In a 100 ml. flask equipped with a reflux condenser was placed 56.0 g. (0.134 mole) of tri(2-ethyl hexyl) phosphite and 12.6 g. (0.067 mole) of ethylene dibromide. This solution was heated at 195–200° for 2 hours. After the by-product 2-ethyl hexyl bromide had been removed under vacuum, the crude ester was fractionated to yield 19.2 g. (45% of the theoretical) of colorless oil, B. P. 238–244° C. at 0.4 mm. pressure. Its refractive index was 1.4530 at 23° C.

Analytical: Calc. for $C_{34}H_{72}O_6P_2$: P, 9.70. Found: P, 9.65.

EXAMPLE 11

*Preparation of tetra(2-ethyl hexyl) 1,3-propane diphosphonate*

In a 5 l. three-neck flask equipped with a stirrer, condenser and dropping funnel was placed 35.4 g. (1.6 moles) of sodium and 1.2 l. of heptane, B. P. 100° C. To this refluxing solution was added 539.3 g. (1.76 moles) of di(2-ethyl hexyl) hydrogen phosphite during an hour. After two hours when the sodium had been used up, 161.5 g. (0.8 mole) of 1,3-dibromopropane was added over a 1-hour period. After an additional 16 hours of refluxing the sodium bromide was removed by washing with water. The solvent was removed and by stripping at a bath temperature of 220° at 0.1 mm. pressure, tetra(2-ethyl hexyl) trimethylene diphosphonate was obtained as a colorless oil. It weighed 355.6 g., a 67% yield. A portion of this distilled readily yielding a colorless heavy oil, B. P. 232–234° C. at 0.02 mm. Its refractive index was 1.4560 at 23°. The overall yield of distilled material was 58%. The undistilled material, therefore, was proved to have a minimum purity of 86%.

Analytical: Calc. for $C_{35}H_{74}O_6P_2$: P, 9.49. Found: P, 9.83, 10.00.

EXAMPLE 12

*Preparation of tetra(2-ethyl hexyl) 1,6-hexane diphosphonate*

In a 5 l. three-neck flask equipped with a stirrer, condenser and dropping funnel was placed 1.5 l. of heptane, B. P. 100°, and 30.6 g. (1.33 moles) of metallic sodium. To this mixture at reflux was added 449.1 g. (1.46 moles) of di(2-ethyl hexyl) hydrogen phosphite during 1 hour. After 2½ hours of refluxing the amount of unreacted sodium was negligible. Then 162.4 g. (0.666 mole) of 1,6-dibromohexane was then added during 1 hour and refluxing was continued for an additional 15 hours. The solvent and low boiling material was removed in vacuo to a bath temperature of 220° at 0.5 mm. The crude ester weighed 439 g., 95% of the amount theoretically possible. A portion of this colorless oil distilled at 240–244°/0.02 mm.; its refractive index was 1.4562 at 26° C. The overall distilled yield of pure ester was 80% proving the crude to be a minimum of 84% purity.

Analysis: Calc. for $C_{38}H_{80}O_6P_2$: P, 8.92. Found: P, 8.76.

EXAMPLE 13

*Preparation of tetra(3,5,5-trimethyl hexyl) 1,3-propane diphosphonate*

In a 5 l. three-neck flask equipped with a stirrer, condenser and dropping funnel was placed 1.2 l. of heptane, B. P. 100°, and 34.5 g. (1.5 mole) of metallic sodium. To this refluxing mixture was added 501.7 g. (1.5 mole) of di(3,5,5-trimethyl hexyl) hydrogen phosphite during thirty minutes. After 2 additional hours of reaction, 2.6 g. (7.5%) of the sodium had not reacted. This was removed and then 140 g. (0.69 mole) of 1,3-dibromopropane was added during one hour. After reaction overnight the solution was washed free of sodium bromide with water and dried by shaking with anhydrous sodium sulfate. Upon removal of the solvent and low boiling material to a boiling point of 167° at 0.1 mm., a white solid precipitated from the oily product. This was removed by filtration and a portion of the liquid was distilled, the main portion of which boiled at 216–225° C. at 0.1 mm. The percentage purity of the crude material (yield 57%) was thus shown to be 87%. A sample of the distilled ester was taken for analysis.

Analysis: Calc. for $C_{39}H_{82}O_6P_2$: P, 8.74. Found: P, 8.73.

By variation of the values of R and $n$, compounds varying in viscosity, boiling point and other properties fitting them for a variety of uses may be made. In the foregoing specific examples we have illustrated compounds in which the number of carbon atoms of the alkyl group R varies from 3 to 9 inclusive and the value of $n$ varies from 2 to 6 inclusive. Our experience with these illustrative compounds clearly indicates that all combinations of all alkyl groups having from 3 to 9 carbon atoms with all values of $n$ from 2 to 6 may be prepared and that all of the resulting compounds will be stable and relatively water-insoluble high boiling liquids.

We claim:

1. A compound of the formula

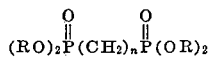

in which R is an alkyl group having from 3 to 9 carbon atoms and $n$ is an integer from 2 to 6.

2. A compound as defined in claim 1 in which R is an alkyl group having 4 carbon atoms.

3. A compound as defined in claim 1 in which R is an alkyl group having 5 carbon atoms.

4. A compound as defined in claim 1 in which R is an alkyl group having 6 carbon atoms.

5. A compound as defined in claim 1 in which R is an alkyl group having 7 carbon atoms.

6. A compound as defined in claim 1 in which R is an alkyl group having 8 carbon atoms.

7. A compound as defined in claim 1 in which $n$ is 2.

8. A compound as defined in claim 1 in which $n$ is 3.

9. A compound as defined in claim 1 in which $n$ is 4.

10. A compound as defined in claim 1 in which $n$ is 5.

11. A compound as defined in claim 1 in which $n$ is 6.

12. As a new product tetrabutyl 1,2-ethane diphosphonate.

13. As a new product tetrabutyl 1,3-propane diphosphonate.

14. As a new product tetra(2-ethyl hexyl) 1,2-ethane diphosphonate.

15. As a new product tetrabutyl 1,6-hexane diphosphonate.

16. As a new product tetraheptyl 1,4-butane diphosphonate.

17. Tetra (2-ethyl hexyl) 1,6-hexamethylene-diphosphonate.

WILLIAM P. BOYER.
JESSE ROGER MANGHAM.

REFERENCES CITED

The following references are of record in the file of this patent:

Kosolapoff: J. Am. Chem. Soc., (1944), vol. 66, pages 1511 to 1512.

Ford-Moore: J. Am. Chem. Soc. (1947), pages 1465–1467.

---

Disclaimer 2,634,288.—*William P. Boyer* and *Jesse Roger Mangham*, Chesterfield County, Va. TETRAALKYL ESTERS OF ALKANE DIPHOSPHONIC ACIDS. Patent dated Apr. 7, 1953. Disclaimer filed Dec. 5, 1956, by the assignee, *Virginia-Carolina Chemical Corporation*.

Hereby enters this disclaimer to claims 1, 2, 3, 6, 7, 8, 9, 10, 11, 12, 13, 15, and 17 of said patent.

[*Official Gazette January 15, 1957.*]

---

Notice of Adverse Decision in Interference

In Interference No. 87,168 involving Patent No. 2,634,288, W. P. Boyer and J. R. Mangham, Tetraalkyl esters of alkane diphosphonic acids, final judgment adverse to the patentees was rendered Oct. 25, 1956 as to claims 1, 2, 3, 6, 7, 8, 9, 10, 11, 13, 15, and 17.

[*Official Gazette March 5, 1957.*]